July 1, 1958 J. H. BREMS ET AL 2,841,008
SURFACE SMOOTHNESS MEASURING MEANS
Filed Sept. 15, 1951 2 Sheets-Sheet 2

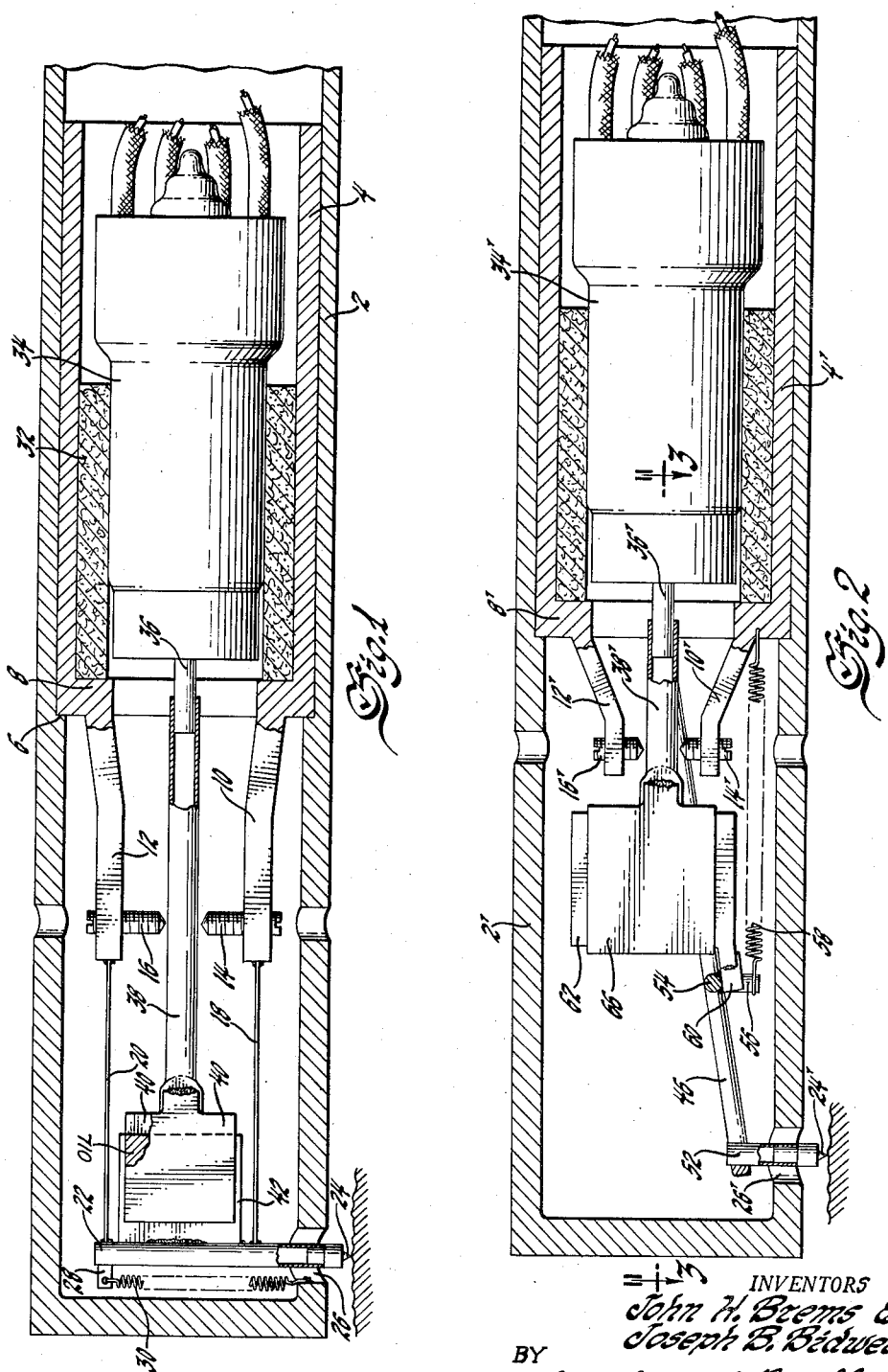

INVENTORS
John H. Brems &
Joseph B. Bidwell
BY
Willits, Helwig & Bailio
ATTORNEYS ns Patent Office 2,841,008
Patented July 1, 1958

2,841,008

SURFACE SMOOTHNESS MEASURING MEANS

John H. Brems, Detroit, and Joseph B. Bidwell, Royal Oak, Mich., assignors to General Motors Corporation, Detroit, Mich., a corporation of Delaware Application September 15, 1951, Serial No. 246,853

8 Claims. (Cl. 73—105)

This invention relates to measuring means and more particularly to means for measuring the smoothness of a machined or ground surface where the irregularities therein are of small magnitude.

It is very desirable at the present to be able to measure and compare the smoothness of metallic surfaces which have been machined or ground due to the present close tolerances and the importance of wear and lubrication of mating moving surfaces. The irregularities in such surfaces are of a very small order and therefore the measuring means must be very sensitive. Since the equipment is to be used in manufacturing plants in production, it must also be as rugged as possible.

It is therefore an object of our invention to provide means for measuring the smoothness of a surface.

It is a further object of our invention to provide surface smoothness measuring means that is rugged and easily operated.

With the above and other objects in view our invention will be best understood by reference to the following specification and claims and the illustrations in the accompanying drawings in which:

Figure 1 is a vertical sectional view through a gage head embodying our invention.

Figure 2 is a similar sectional view taken through a gage head showing a modified form of our invention.

Figure 3:
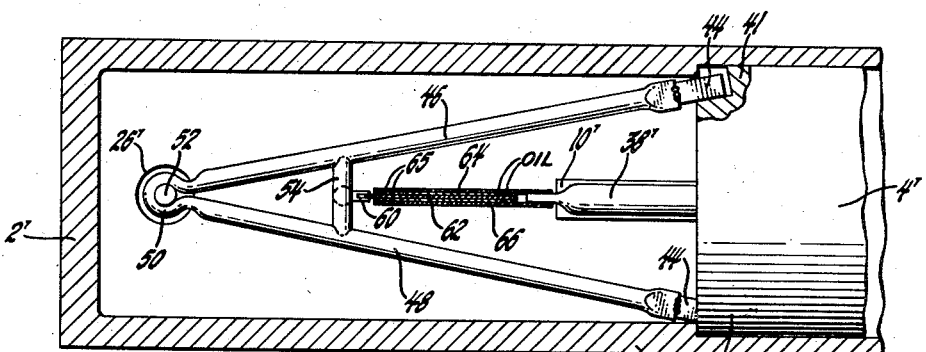
Figure 3 is a sectional view taken on the line 3—3 of Figure 2.

The present equipment includes a gage head or scanning unit which in this case is a small housing which is applied to and drawn over the surface by hand. The remaining part of the system is an amplifying and indicating means which may be located at a distance from the head, being connected thereto by cable.

The gage head is best understood by reference to Figure 1 wherein there is shown a cylindrical housing 2 within which is mounted a smaller cylindrical member 4 of a shorter length than the housing 2 and insertable within one end of the housing until it encounters a shoulder 6 where the internal bore of the housing changes. The front of the member 4 extends radially for a short distance to provide a circular flange 8 and thence forwardly to form two arms 10 and 12 which support two adjustable limit screws 14 and 16. Fixedly secured to the ends of the arms 10 and 12 by welding or other suitable means are two parallel flexible rods or strips 18 and 20. These are rigidly secured to and support at their outer ends a vertical tubular member 22 in which the follower or stylus 24 is mounted. This tubular member extends through an opening 26 in the housing member 2. A bracket 28 is secured to the inner end of the tubular member 22 and one end of a coil spring 30 is secured to the bracket and the other end to the housing to bias the stylus downwardly with respect to the housing.

A liner 32 of soft material such, for example, as sponge rubber lines a portion of the member 4 and mounts therein an electronic tube 34. This tube 34 is of the type in which one wall through which the mount for one of the electrodes extends is flexible so that mechanical movement of the extending part will cause movement of the internal electrode to cause a variation in the conductance of the tube to vary the voltage and current in the electrical circuit in which the tube is connected. Such a tube as the current RCA 5734 might be used. In the present case the rod 36 extending from the end of the tube is connected to the plate of the tube to move the same.

A cylindrical sleeve 38 is forced over the rod end 36 and has its opposite end rigidly secured to two flat spaced plates 40 which form a part of what might be termed a viscous coupler for driving the rod 36. The other half of the viscous coupler is formed of a plate 42, having its edge secured to the cylindrical member 22 and lying parallel to and between the plates 40. The plate surfaces are not in contact but lie in very close proximity. The space therebetween is filled with a layer of oil in which the shearing stress is proportional to the rate of shear held in place by its surface tension so that as the plate 42 moves, driven by the stylus 24, this movement may be transferrer to the rod 36 through the plates 40.

Since this gage head is spring biased by spring 30 to tend to eject the stylus from the opening 26, this movement is limited by the adjustment of the limit screw 14 and the spring tension in the strips 18 and 20. Thus when the head is applied to any surface the stylus will asume different positions with respect to the housing 2, depending upon the curvature and configuration. It is desired to have the rod 36 assume a substantially uniform position when active. Therefore to accomplish this and also remove very low frequency oscillations due to contour, the viscous coupler above described was introduced. At frequencies below 5 C. P. S. or for adjustments the plates 42 will move with respect to the plate 40, but at frequencies above that figure it becomes substantially a rigid transfer member and accurately transmits the vibrations due to surface irregularities to the tube anode. It therefore permits original adjustment of the stylus to the surface contour but immediately becomes a rigid force transmitting member at any frequency of surface gaging.

A modified form of our gage head is illustrated in Figures 2 and 3. A similar housing 2' is shown which has a smaller insertable cylindrical member 4' having a forward flange 8' and two forwardly extending arms 10' and 12' shorter than arms 10 and 12 in Figure 1, but supporting limit screws 14' and 16'. In a plane at 90° to that through arms 10' and 12', on opposite sides of the member 4', there are mounted short resilient strips 44 to which the legs 46 and 48 of an A-shaped frame are rigidly fastened. The peak 50 of the frame supports a stylus holding member 52 for the stylus 24', which projects through an opening 26' in the housing 2'. The cross member 54 of the frame has a central downward projection 56 which acts as an anchor for one end of the biasing spring 58, the other end of which is fastened to the flange 8'. A short strip 60 extends from the projection 56 and carries a plate 62 of a viscous coupler.

The rod 36' connected to the movable electrode of tube 34' is connected through sleeve 38' to the two outside plates 64 and 66 which enclose the central plate 62. Again these plates are separated and mechanically joined by an oil film 65 which permits adjustments between the parts and filters out low frequencies but becomes rigid driving member assembly at high frequencies. The operation of this form is the same as the previous one. The operator brings the head into proximity with a surface to be gaged and the stylus engages the surface and forces the cylindrical holder 52 upward pivoting the A frame and moving plate 62 between plates 64 and 66 to permit rod 36' to remain aproximately where it was and yet adjust the stylus to the work. The operator then begins to move the gage over the surface and the stylus vibrates in conformity with the irregularities and at the frequencies generated the viscous coupler acts like a rigid transfer connection, and the anode of the tube changes its position to develop voltage changes proportionate to the surface changes.

Figure 4:
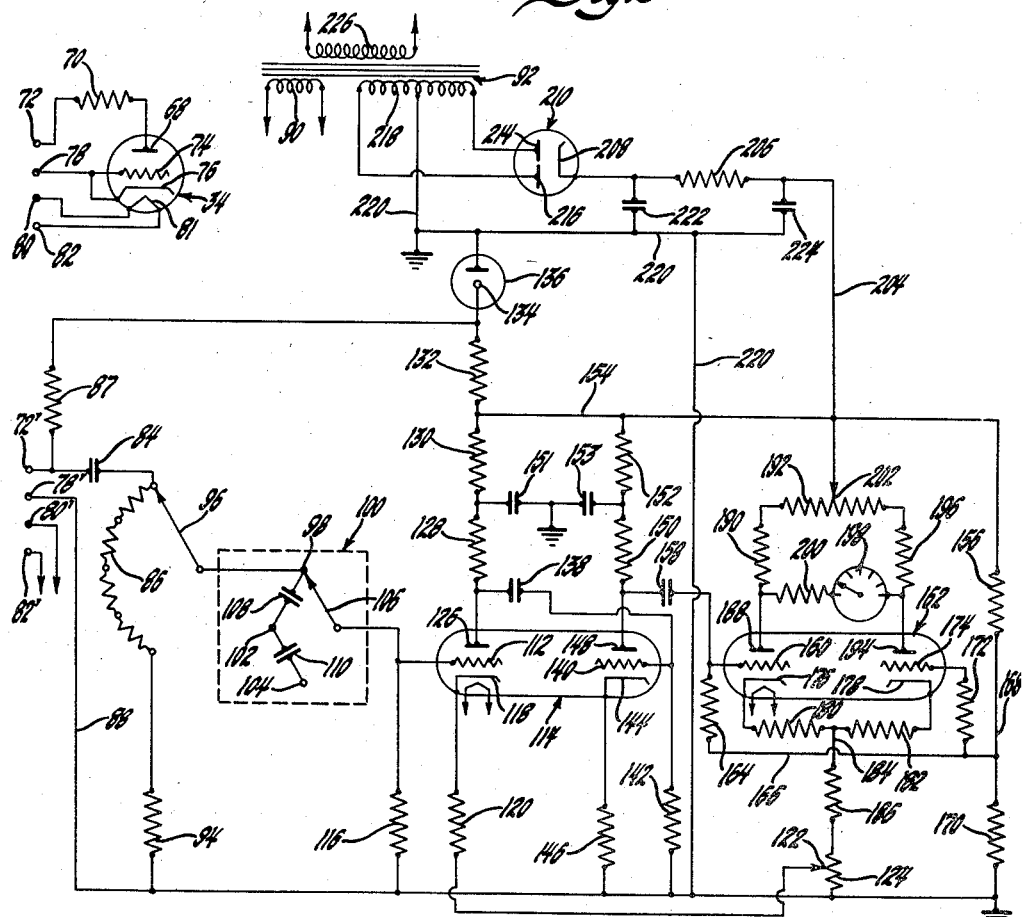
Figure 4 is a schematic wiring diagram of the electrical circuit utilized.

The electrical amplifying and indicating system used with the gage head is shown in Figure 4. The tube 34 is shown in the upper left-hand corner of the figure. The plate 68 is connected through a resistor 70 to one terminal 72 of a plug. The grid 74 and cathodes 76 are connected together outside of the tube and then extend to terminal 78 of the plug. The other two terminals 80 and 82 are connected to the filament 81. The corresponding mating terminals 72', 78', 80' and 82' are connected to the main amplifier.

Terminal 72' is connected through coupling condenser 84 to one terminal of a tapped resistance 86. Terminal 78' is connected through line 88 to ground and terminals 80' and 82' are connected to a source of power for the filaments which in this case is secondary winding 90 of the power transformer 92. This connection is indicated by arrow heads as are the other filament connections.

The opposite terminal of the resistance 86 is connected through resistor 94 to line 88. The variably positioned arm 96 engaging the tapped resistance 86 is connected to a fixed contact 98 of a switch 100. This switch consists of two other fixed contacts 102 and 104 and a movable contact arm 106 engageable with any of them. A condenser 108 is connected between contacts 98 and 102 and a condenser 110 is connected between contacts 102 and 104. The movable contact arm 106 is directly connected to grid 112 of the first triode section of a double triode tube 114. It is also connected through resistor 116 to ground. The cathode 118 of the first triode section of tube 114 is connected through resistance 120 to an adjustable tap 122 on resistor 124 to adjust the gain.

The plate 126 of the first section is connected through three resistances 128, 130 and 132 in series to an electrode 134 of a voltage regulating tube 136. It is also connected through condenser 138 to the control grid 140 of the second section of the tube 114 and through resistor 142 to ground. A resistor 87 is connected between the plug terminal 72' and regulator tube 136 to provide plate voltage for tube 34. Cathode 144 of the second section is connected to ground through resistor 146. The plate 148 of the second section of the tube 114 is connected directly to two resistances 150 and 152 in series relation and thence to line 154 which extends from a point between resistors 130 and 132 to resistor 156. Two series condensers 151 and 153 connect the junctures of resistors 128—130 with that of 150—152, the center point of condensers 151 and 153 being grounded. Thus the first two stages of the amplifier are straight resistance-capacity coupled cascaded amplifiers.

The remaining stage is push-pull operated utilizing a duo-triode tube. The plate 148 of the second section of the tube 114 is connected through condenser 158 to the control grid 160 of the first triode section of tube 162. It is also connected to one end of resistor 164, the opposite end of which is connected to line 166 which extends to tie line 168. Tie line 168 interconnects resistors 156 and 170, the opposite terminal of the latter being grounded. Resistor 172 is connected to line 166 and also to grid 174 of the second section of tube 162. Cathodes 176 and 178 of the two sections are connected to line 184 through two resistors 180 and 182 respectively. A resistor 186 is connected to line 184 and to potentiometer 124.

Plate 188 of the first section of tube 162 is directly connected to resistor 190 and through that to one terminal of potentiometer 192. Plate 194 of the second section is connected in like manner through a resistor 196 to the opposite side of the potentiometer 192. A meter 198 and limiting resistor 200 are connected in series across the plates 188 and 194. The variable tap 202 of the potentiometer 192 is connected to the power supply line 154. A tie line 204 interconnects line 154 with one terminal of resistor 206, the opposite terminal of which is connected to the anode 208 of a full wave rectifier tube 210, the cathodes 214 and 216 of which are connected to the terminals of the transformer secondary 218. The center tap of the secondary is grounded through line 220 and two condensers 222 and 224 are connected from opposite ends of the resistor 206 to ground line 220. The primary 226 of the transformer 92 is connected to any suitable source of power.

The pick-up unit electrically consists of a transducer tube and a resistor. Since these units are separable from and connected to the power supply and amplifier section by a disconnectable plug, it is desirable to be able to use any pick-up unit with an amplifier. The tubes 34 vary considerably in sensitivity and therefore in order to use them interchangeably with amplifying and indicating means, a loading resistor 70 is individually selected for each and mounted therewith so that each complete unit has the same sensitivity, such for example as 1 millivolt per microinch.

When the disconnect plug is assembled, the signal from the pick-up unit plate is fed into the amplifier through the coupling condenser 84 and the stepped resistor 86—96, which determines the range necessary, and then through the variable cut-off circuit consisting of condensers 108 and 110. The value of these condensers determines the low frequency cut-off. Thus the signal is applied to the grid of the first amplifier stage.

In general the system comprises the pick-up unit, which is a hand-held and moved device connected to the amplifying and indicating means by cable for remote operation. It is relatively small and easily pulled over the surface. The operator merely places the unit on the surface to be gaged with the stylus in contact therewith and pulls the unit over the surface.

The remainder of the equipment consists of a power supply section including transformer 92 and rectifier 210, which supply power to the plates of the push-pull output stage, filtered power to the plates of the first two stages through decoupling filters 130, 151 and 152, 153 and regulated power to the anode of the pick-up tube through voltage regulator tube 136. Degenerative feedback is provided by the adjustable potentiometer 122—124 which is connected back to cathode 118 of the first stage of the amplifier through resistor 120. This provides better stability of operation and more linearity of response. The incoming signal from the tube 34 is therefore applied through the resistance-capacitance coupling to the amplifier and the results read on the meter 198, which may be calibrated directly in surface smoothness units.

We claim:

1. A pickup unit for measuring surface smoothness comprising an elongated hollow casing, a sleeve of shorter length fitting within said casing, spaced resilient members supported on the inner end of the sleeve, a stylus holder connected to the ends of the members and movable transversely of the casing and extending through an opening in the side of said casing, an electron tube mounted within said sleeve and having a resilient inner end wall capable of being deformed but maintaining a given position of rest, and an electrode within the tube secured to said end wall to be moved from outside the tube, a projection secured to said wall to move the same and the electrode to vary the position of the latter, and means interconnecting said stylus holder and the projection to transfer movement of the stylus holder to the tube element.

2. A pickup unit for measuring surface smoothness comprising an elongated hollow casing, a sleeve of shorter length fitting within said casing, spaced resilient members supported on the inner end of the sleeve, a stylus holder connected to the ends of the members and movable transversely of the casing and extending through an opening in the side of said casing, an electron tube mounted within said sleeve and having a resilient inner end wall capable of being deformed but maintaining a given position of rest, and an electrode within the tube secured to said end wall to be moved from outside the tube, a projection secured to said wall to move the same end the electrode to vary the position of the latter, a first rigid means connected to said projection and having an enlarged area, a second rigid means connected to the stylus holder and having an enlarged area located in juxtapositioned to the enlarged area of the first rigid means, and a fluid layer between the two enlarged areas to provide a viscous coupler between the stylus holder and the projection from the tube.

3. A pickup unit for measuring surface smoothness comprising an elongated hollow casing, a sleeve of shorter length fitting within said casing, spaced resilient members supported on the inner end of the sleeve, a stylus holder connected to the ends of the members and movable transversely of the casing and extending through an opening in the side of said casing, an electron tube mounted within said sleeve and having a resilient inner end wall capable of being deformed but maintaining a given position of rest, and an electrode within the tube secured to said end wall to be moved from outside the tube, a projection secured to said wall to move the same and the electrode to vary the position of the latter, and viscous coupling means including a fluid layer retained in place by surface tension alone interconnecting said stylus holder and said projecton to act as a high frequency coupling element between the two.

4. A pickup unit for measuring surface smoothness comprising an elongated hollow casing, a sleeve of shorter length fitting within said casing, spaced resilient members supported on the inner end of the sleeve, a stylus holder connected to the ends of the members and movable transversely of the casing and extending through an opening in the side of said casing, an electron tube mounted within said sleeve and having a resilient inner end wall capable of being deformed but maintaining a given position of rest, and an electrode within the tube secured to said end wall to be moved from outside the tube, a projection secured to said wall to move the same and the electrode to vary the position of the latter, a first rigid member connected to said projection and having a flat area lying in a plane parallel to the stylus holder, a second rigid means connected to the stylus holder and having a flat area spaced from but parallel with the flat area of the first rigid member and a film of fluid retained by surface tension only between the two flat areas to provide a viscous coupling between the stylus holder and the tube projection to transfer high frequency vibration from one to the other but permit slow adjustment of one with respect to the other to allow the resilient wall to assume its normal position prior to the introduction of high frequency vibration transmission due to surface irregularities.

5. A pickup unit for measuring surface smoothness comprising an elongated hollow casing, a sleeve of shorter length fitting within said casing and having a pair of arms projecting into said casing from the inner end of the sleeve, spaced resilient members supported on the ends of the arms, a stylus holder connected to the ends of the members and movable transversely of the casing extending through an opening in the side of said casing, spring biasing means connected to said stylus holder tending to eject it from the opening, an electron tube mounted within said sleeve and having a resilient inner end wall capable of being deformed but maintaining a given position of rest, said inner wall being located adjacent the arms, and having a tube electrode secured thereto to be moved from outside the tube, a projection secured to said wall to move the same and the electrode within the tube to vary the position of the latter, and means interconnecting said stylus holder and the projection to transfer movement of the stylus holder to the tube element.

6. A pickup unit for measuring surface smoothness comprising a casing, a stylus holder resiliently mounted within the casing and having an appreciable movement, biasing means tending to bias the stylus holder outwardly through an opening in the casing, an electron tube mounted within the casing and having a resilient inner end wall capable of being deformed but maintaining a given normal neutral position and supporting an internal electrode, an exterior projection secured to said wall to move the same and the inner electrode to vary the position of the latter, a first rigid member connected to said projection and having a flat area lying in a plane parallel to the stylus holder, a second rigid means connected to the stylus holder and having a flat area spaced from but parallel with the flat area of the first rigid member, and a film of fluid retained by surface tension only between the two areas to provide a viscous coupling between the stylus holder and the tube projection to transmit high frequency movements from one to the other but permit slow adjustment of one with respect to the other to permit the resilient wall to assume its normal neutral position to accommodate general surface contour prior to the introduction of high frequency movement transmission due to surface irregularities.

7. In means for indicating the irregularities in a surface, a pickup unit adapted to be moved over a surface providing signals proportional to elevational changes in a plane surface comprising a housing, electronic means mounted in the housing having movable means therein whose position will vary conductance through said means and which has a normal neutral position, means accessible from the exterior of the electronic means connected to said movable means to move the same and change the conductance of said electronic means, a stylus mounted within the housing for axial movement through an opening therein capable of moving far enough to distort the response of the electronic means if directly connected to the means accessible from the exterior of the electronic means, a viscous coupler comprising a plurality of flat spaced parallel plates arranged in planes parallel to the axis of the stylus and alternately connected to the stylus and to the means accessible from the exterior of the electronic means and films of oil between the plates held in place by surface tension so that the stylus may be adjusted for general surface configuration but maintain the neutral position of the movable means but higher frequency movement of the stylus will be transmitted directly to the electronic means.

8. In means for indicating the irregularities in a surface, a pickup unit adapted to be moved over a surface providing signals proportional to elevational changes in a plane surface comprising a housing, a multi-element electron tube having one element that may be moved with respect to the others and which has a normal neutral position, means accessible from the exterior of the tube connected to the movable element to move the same and vary the conductance through the tube, a stylus mounted within the housing for axial movement through an opening in said housing and capable of moving far enough to distort the response of the tube if directly connected to the means accessible from the exterior of the tube, a viscous coupler comprising a plurality of flat spaced parallel plates arranged in planes parallel to the axis of the stylus and alternately connected to the stylus and the means accessible from the exterior of the tube, films of oil between the plates held in place by surface tension so that the stylus may be adjusted for general surface configuration but more rapid fluctuations of the stylus will be transmitted directly to the tube.

(References on following page)

References Cited in the file of this patent

UNITED STATES PATENTS

| | | |
|---|---|---|
| 1,977,433 | Dunning | Oct. 16, 1934 |
| 2,165,981 | Sampson | July 11, 1939 |
| 2,305,264 | Leonard | Dec. 15, 1942 |
| 2,320,429 | Hasbrouck | June 1, 1943 |
| 2,405,133 | Brown | Aug. 6, 1946 |
| 2,460,726 | Arndt | Feb. 1, 1949 |
| 2,471,009 | Reason | May 24, 1949 |
| 2,522,567 | Cook | Sept. 19, 1950 |
| 2,548,809 | Norman | Apr. 10, 1951 |
| 2,565,837 | Ansar | Aug. 28, 1951 |